US012455241B2

(12) United States Patent
Yamamoto

(10) Patent No.: US 12,455,241 B2
(45) Date of Patent: Oct. 28, 2025

(54) SAMPLE OBSERVATION DEVICE AND SAMPLE OBSERVATION METHOD

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 443 days.

(21) Appl. No.: 17/925,131

(22) PCT Filed: Mar. 17, 2021

(86) PCT No.: PCT/JP2021/010879
§ 371 (c)(1),
(2) Date: Nov. 14, 2022

(87) PCT Pub. No.: WO2021/246021
PCT Pub. Date: Dec. 9, 2021

(65) Prior Publication Data
US 2023/0184681 A1 Jun. 15, 2023

(30) Foreign Application Priority Data
Jun. 1, 2020 (JP) .................. 2020-095508

(51) Int. Cl.
G01N 21/64 (2006.01)
G02B 21/00 (2006.01)
G02B 21/06 (2006.01)

(52) U.S. Cl.
CPC ..... *G01N 21/6456* (2013.01); *G01N 21/6452* (2013.01); *G02B 21/0032* (2013.01);
(Continued)

(58) Field of Classification Search
None
See application file for complete search history.

(56) References Cited

U.S. PATENT DOCUMENTS 5,703,714 A * 12/1997 Kojima ................. G02B 21/06
250/201.3
6,621,628 B1 * 9/2003 Ogino ................. G02B 21/008
359/388
(Continued)

FOREIGN PATENT DOCUMENTS

EP 3534198 A1 9/2019
JP 2012-226145 A 11/2012
(Continued)

OTHER PUBLICATIONS

Kobayashi, Masanori et al., "Light Irradiation Device and Sample Observation Apparatus," U.S. Appl. No. 17/924,160, filed Nov. 9, 2022, 37 pages.
(Continued)

*Primary Examiner* — David E Smith
*Assistant Examiner* — Alina Kaliszewski
(74) *Attorney, Agent, or Firm* — Faegre Drinker Biddle & Reath LLP

(57) ABSTRACT

In this sample observation device, a reference table in which an optimum light amount of planar light at a measurement sensitivity represented by the product of a light amount of the planar light and a scanning speed is set according to the scanning speed is referred to, and the scanning speed of a scanning unit and the optimum light amount of the planar light that is applied to a sample are determined on the basis of the measurement sensitivity selected by a user.

12 Claims, 8 Drawing Sheets

(52) U.S. Cl.
CPC . *G02B 21/0036* (2013.01); *G01N 2021/6439* (2013.01); *G01N 2201/103* (2013.01); *G02B 21/06* (2013.01); *G02B 2207/113* (2013.01)

(56) References Cited

U.S. PATENT DOCUMENTS

| | | | |
|---|---|---|---|
| 10,295,814 | B2 | 5/2019 | Siebenmorgen et al. |
| 2012/0019626 | A1* | 1/2012 | Hou .................. G01N 21/9501 348/136 |
| 2013/0314520 | A1* | 11/2013 | Ishihara ................ A61B 1/043 348/68 |
| 2018/0088308 | A1 | 3/2018 | Liu et al. |
| 2019/0250385 | A1* | 8/2019 | Zhu ..................... G02B 21/006 |
| 2020/0041776 | A1 | 2/2020 | Yamamoto et al. |
| 2020/0132603 | A1 | 4/2020 | Sugiyama et al. |
| 2020/0158633 | A1 | 5/2020 | Yamamoto et al. |
| 2021/0088446 | A1 | 3/2021 | Sugiyama et al. |
| 2021/0116373 | A1* | 4/2021 | Sugiyama ............ G02B 21/367 |
| 2021/0116692 | A1 | 4/2021 | Kobayashi et al. |
| 2022/0342196 | A1* | 10/2022 | Fahrbach ............. G02B 21/367 |

FOREIGN PATENT DOCUMENTS

| | | |
|---|---|---|
| JP | 2017-053918 A | 3/2017 |
| JP | 2018-520388 A | 7/2018 |
| JP | 2019-526829 A | 9/2019 |
| JP | 2019-184401 A | 10/2019 |
| JP | 2019-184403 A | 10/2019 |
| WO | WO-2017/013054 A1 | 1/2017 |
| WO | WO-2018/033582 A1 | 2/2018 |

OTHER PUBLICATIONS

Yamamoto, Satoshi, "Sample Observation Device and Sample Observation Method," U.S. Appl. No. 17/925,131, filed Nov. 14, 2022, 41 pages.

Yamamoto, Satoshi et al., "Sample Observation Device and Sample Observation Method," U.S. Appl. No. 17/928,992, filed Dec. 1, 2022, 75 pages.

International Preliminary Report on Patentability mailed Dec. 15, 2022 for PCT/JP2021/010879.

* cited by examiner (A)

| REFERENCE TABLE | | SCANNING SPEED [mm/s] | | | | | |
| --- | --- | --- | --- | --- | --- | --- | --- |
| MEASUREMENT SENSITIVITY | RELATIVE VALUE | 10 | 8.5 | 7 | 5.5 | 4 | 2.5 |
| - | 1 | 10% | | | | | |
| 1 | 2 | 20% | | | | | |
| 2 | 4 | 40% | | | | | |
| 3 | 6 | 60% | | | | | |
| 4 | 8 | 80% | | | | | |
| 5 | 10 | 100% | | | | | |
| 6 | 12 | | | 84% | | | |
| 7 | 14 | | | 98% | | | |
| 8 | 16 | | | | 88% | | |
| 9 | 18 | | | | 99% | | |
| 10 | 20 | | | | | 80% | |
| 11 | 22 | | | | | 88% | |
| 12 | 24 | | | | | 96% | |
| 13 | 26 | | | | | | 65% |
| 14 | 28 | | | | | | 70% |
| 15 | 30 | | | | | | 75% |
| 16 | 32 | | | | | | 80% |
| 17 | 34 | | | | | | 85% |
| 18 | 36 | | | | | | 90% |
| 19 | 38 | | | | | | 95% |
| 20 | 40 | | | | | | 100% |

| REFERENCE TABLE | | SCANNING SPEED [mm/s] | | | | | |
|---|---|---|---|---|---|---|---|
| MEASUREMENT SENSITIVITY | RELATIVE VALUE | 10 | 8.5 | 7 | 5.5 | 4 | 2.5 |
| - | 1 | | | | | | |
| 1 | 2 | | 17% | | | | |
| 2 | 4 | | 34% | | | | |
| 3 | 6 | | 51% | | | | |
| 4 | 8 | | 68% | | | | |
| 5 | 10 | | 85% | | | | |
| 6 | 12 | | | 84% | | | |
| 7 | 14 | | | 98% | | | |
| 8 | 16 | | | | 88% | | |
| 9 | 18 | | | | 99% | | |
| 10 | 20 | | | | | 80% | |
| 11 | 22 | | | | | 88% | |
| 12 | 24 | | | | | 96% | |
| 13 | 26 | | | | | | 65% |
| 14 | 28 | | | | | | 70% |
| 15 | 30 | | | | | | 75% |
| 16 | 32 | | | | | | 80% |
| 17 | 34 | | | | | | 85% |
| 18 | 36 | | | | | | 90% |
| 19 | 38 | | | | | | 95% |
| 20 | 40 | | | | | | 100% |

| REFERENCE TABLE | | SCANNING SPEED [mm/s] | | | | | |
|---|---|---|---|---|---|---|---|
| MEASUREMENT SENSITIVITY | RELATIVE VALUE | 10 | 8.5 | 7 | 5.5 | 4 | 2.5 |
| - | 1 | | | | | | |
| 1 | 2 | | | 14% | | | |
| 2 | 4 | | | 28% | | | |
| 3 | 6 | | | 42% | | | |
| 4 | 8 | | | 56% | | | |
| 5 | 10 | | | 70% | | | |
| 6 | 12 | | | 84% | | | |
| 7 | 14 | | | 98% | | | |
| 8 | 16 | | | | 88% | | |
| 9 | 18 | | | | 99% | | |
| 10 | 20 | | | | | 80% | |
| 11 | 22 | | | | | 88% | |
| 12 | 24 | | | | | 96% | |
| 13 | 26 | | | | | | 65% |
| 14 | 28 | | | | | | 70% |
| 15 | 30 | | | | | | 75% |
| 16 | 32 | | | | | | 80% |
| 17 | 34 | | | | | | 85% |
| 18 | 36 | | | | | | 90% |
| 19 | 38 | | | | | | 95% |
| 20 | 40 | | | | | | 100% |

SAMPLE OBSERVATION DEVICE AND SAMPLE OBSERVATION METHOD

TECHNICAL FIELD

The present disclosure relates to a sample observation device and a sample observation method.

BACKGROUND ART

Selective plane illumination microscopy (SPIM) is known as one of methods for observing the inside of a sample having a three-dimensional structure such as a cell. As a technique related to such a method, for example, there is a sample observation device described in Patent Literature 1. The sample observation device of Patent literature 1 includes an irradiation optical system that irradiates a sample with planar light on an XZ surface, a scanning unit that scans the sample in a Y-axis direction with respect to an irradiation surface of the planar light, and an imaging optical system that has an observation axis inclined with respect to the irradiation surface and images an observation light generated in the sample by irradiation with the planar light. In this sample observation device, a plurality of pieces of XZ image data of the sample are acquired in the Y-axis direction, and pieces of X image data generated by integrating luminance values of an analysis area in the XZ image data in the Z direction are coupled in the Y-axis direction to generate XY image data of the sample.

CITATION LIST

Patent Literature

[Patent Literature 1] Japanese Unexamined Patent Publication No. 2019-184401

SUMMARY OF INVENTION

Technical Problem

In the sample observation device as described above, it is important to optimize measurement conditions required when acquiring the observation light from the sample as image data in order to realize analysis of the sample. However, in order to optimize the measurement conditions, it is necessary to set each element such as a light source, a scanning unit, and an image acquisition unit, and simplification of the setting is a problem to be solved.

The present disclosure has been made to solve the above problem, and an object of the present disclosure is to provide a sample observation device and a sample observation method capable of simplifying the setting of measurement conditions.

Solution to Problem

According to an aspect of the present disclosure, there is provided a sample observation device including: a light source unit configured to output excitation light to a sample; an irradiation optical system configured to shape the excitation light into planar light and to irradiate the sample with the planar light on an XZ surface; a scanning unit configured to scan the sample in a Y-axis direction at a predetermined scanning speed to pass through an irradiation surface of the planar light; an imaging optical system having an observation axis inclined with respect to the irradiation surface and configured to image an observation light generated in the sample by irradiation with the planar light; an image acquisition unit configured to acquire a plurality of pieces of XZ image data corresponding to an optical image of the observation light imaged by the imaging optical system in the Y-axis direction at a predetermined frame rate; and a control unit configured to control a light amount of the planar light and the scanning speed, wherein the control unit refers to a reference table in which an optimum light amount of the planar light at a measurement sensitivity represented by the product of the light amount of the planar light and the scanning speed is set in accordance with the scanning speed and determines the scanning speed and the optimum light amount of the planar light on the basis of the measurement sensitivity selected by a user.

In this sample observation device, the concept of measurement sensitivity represented by the product of the light amount of the planar light and the scanning speed is introduced, and the scanning speed of the sample and the optimum light amount of the planar light that is applied to the sample are determined according to the measurement sensitivity selected by the user. In a case where the observation of the sample is performed, it is necessary to control the scanning speed of the sample and an exposure time such that a resolution in an X-axis direction and a resolution in the Y-axis direction are equal to each other in the image acquisition unit. Since the exposure time can be determined on the basis of the number of pixels of the image acquisition unit, it is possible to calculate the scanning speed at which the resolution in the X-axis direction and the resolution in the Y-axis direction are equal to each other. Further, the light amount of the observation light that can be acquired by the image acquisition unit is determined by the product of the light amount of the observation light per unit time and the exposure time. The light amount of the observation light can be determined on the basis of the light amount of the planar light that is applied to the sample, and the exposure time can be determined on the basis of the scanning speed of the sample. That is, the measurement sensitivity can be determined by the light amount of the planar light for the same scanning speed. In the sample observation device, the reference table in which the optimum light amount of the planar light at the measurement sensitivity is set according to the scanning speed is referred to, and thus both the scanning speed and the optimum light amount of the planar light can be determined on the basis of the measurement sensitivity selected by the user. Therefore, it is possible to simplify the setting of measurement conditions.

The control unit may determine a maximum scanning speed that can be obtained at the frame rate as the scanning speed. The scanning speed is a parameter related to a throughput of the sample observation. Therefore, by determining the maximum scanning speed that can be obtained at the frame rate as the scanning speed, it is possible to improve the throughput of the sample observation.

The control unit may have a plurality of different reference tables according to the frame rate, may select one reference table from the plurality of reference tables on the basis of a frame rate corresponding to a sub-array size of the image acquisition unit which is selected by the user, and may determine the scanning speed and the optimum light amount using the selected reference table. Since the frame rate increases as the sub-array size decreases, it is possible to increase the maximum value of the scanning speed. Therefore, by selectively using the plurality of different reference tables according to the frame rate, it is possible to more reliably improve the throughput of the sample observation.

The control unit may control a light amount of the excitation light that is output from the light source unit on the basis of the determined optimum light amount. By controlling the light amount of the excitation light, it is possible to easily control the light amount of the planar light.

The light source unit may have a plurality of dimming filters having different transmittances from each other, and the control unit may select one dimming filter from the plurality of dimming filters on the basis of the determined optimum light amount and may control the light amount of the excitation light that is output from the light source unit. Therefore, the light amount of the excitation light can be easily controlled.

The control unit may control a current value or a voltage value that is applied to the light source unit on the basis of the determined optimum light amount. Even in this case, the light amount of the excitation light can be easily controlled.

According to an aspect of the present disclosure, there is provided a sample observation method including: an output step of outputting excitation light to a sample; an irradiation step of shaping the excitation light into planar light and irradiating the sample with the planar light on an XZ surface; a scanning step of scanning the sample in a Y-axis direction at a predetermined scanning speed to pass through an irradiation surface of the planar light; an imaging step of imaging an observation light generated in the sample by irradiation with the planar light using an imaging optical system having an observation axis inclined with respect to the irradiation surface; an image acquisition step of acquiring a plurality of pieces of XZ image data corresponding to an optical image of the observation light imaged by imaging optical system in the Y-axis direction at a predetermined frame rate; and a control step of controlling a light amount of the planar light and the scanning speed in executing each of the steps, wherein, in the control step, a reference table in which an optimum light amount of the planar light at a measurement sensitivity represented by the product of the light amount of the planar light and the scanning speed is set according to the scanning speed is referred to and the scanning speed and the optimum light amount of the planar light on the basis of the measurement sensitivity selected by a user is determined.

In this sample observation method, the concept of measurement sensitivity represented by the product of the light amount of the planar light and the scanning speed is introduced, and the scanning speed of the sample and the optimum light amount of the planar light that is applied to the sample are determined according to the measurement sensitivity selected by the user. In a case where the observation of the sample is performed, it is necessary to control the scanning speed of the sample and an exposure time such that a resolution in an X-axis direction and a resolution in the Y-axis direction are equal to each other in the image acquisition step. Since the exposure time can be determined on the basis of the number of pixels at the time of image acquisition, it is possible to calculate the scanning speed at which the resolution in the X-axis direction and the resolution in the Y-axis direction are equal to each other. Further, the light amount of the observation light that can be acquired in the image acquisition step is determined by the product of the light amount of the observation light per unit time and the exposure time. The light amount of the observation light can be determined on the basis of the light amount of the planar light that is applied to the sample, and the exposure time can be determined on the basis of the scanning speed of the sample. That is, the measurement sensitivity can be determined by the light amount of the planar light for the same scanning speed. In the sample observation method, the reference table in which the optimum light amount of the planar light at the measurement sensitivity is set according to the scanning speed is referred to, and thus both the scanning speed and the optimum light amount of the planar light can be determined on the basis of the measurement sensitivity selected by the user. Therefore, it is possible to simplify the setting of measurement conditions.

In the control step, a maximum scanning speed that can be obtained at the frame rate may be determined as the scanning speed. The scanning speed is a parameter related to a throughput of a device required for observing the sample. Therefore, by determining the maximum scanning speed that can be obtained at the frame rate as the scanning speed, it is possible to improve the throughput of the sample observation.

In the control step, a plurality of different reference tables according to the frame rate may be used, one reference table from the plurality of reference tables may be selected on the basis of a frame rate corresponding to a sub-array size at the time of executing the image acquisition step which is selected by the user, and the scanning speed and the optimum light amount may be determined using the selected reference table. Since the frame rate increases as the sub-array size decreases, it is possible to increase the maximum value of the scanning speed. Therefore, by selectively using the plurality of different reference tables according to the frame rate, it is possible to more reliably improve the throughput of the sample observation.

In the control step, a light amount of the excitation light in the output step may be controlled on the basis of the determined optimum light amount. By controlling the light amount of the excitation light, it is possible to easily control the light amount of the planar light.

In the output step, a plurality of dimming filters having different transmittances from each other may be used, and in the control step, one dimming filter may be selected from the plurality of dimming filters on the basis of the determined optimum light amount, and the light amount of the excitation light in the output step may be controlled. Therefore, the light amount of the excitation light can be easily controlled.

In the control step, a current value or a voltage value that is applied to a light source unit that outputs the excitation light may be controlled on the basis of the determined optimum light amount, and the light amount of the excitation light in the output step may be controlled. Even in this case, the light amount of the excitation light can be easily controlled.

Advantageous Effects of Invention

According to the present disclosure, it is possible to simplify the setting of measurement conditions.

BRIEF DESCRIPTION OF DRAWINGS

FIG. 5 is a diagram showing an example of a reference table when a frame rate is high.

FIG. 6 is a diagram showing an example of a reference table when a frame rate is medium.

FIG. 7 is a diagram showing an example of a reference table when a frame rate is low.

DESCRIPTION OF EMBODIMENTS

Hereinafter, preferred embodiments of a sample observation device and a sample observation method according to an aspect of the present disclosure will be described in detail with reference to the drawings.

Figure 1:
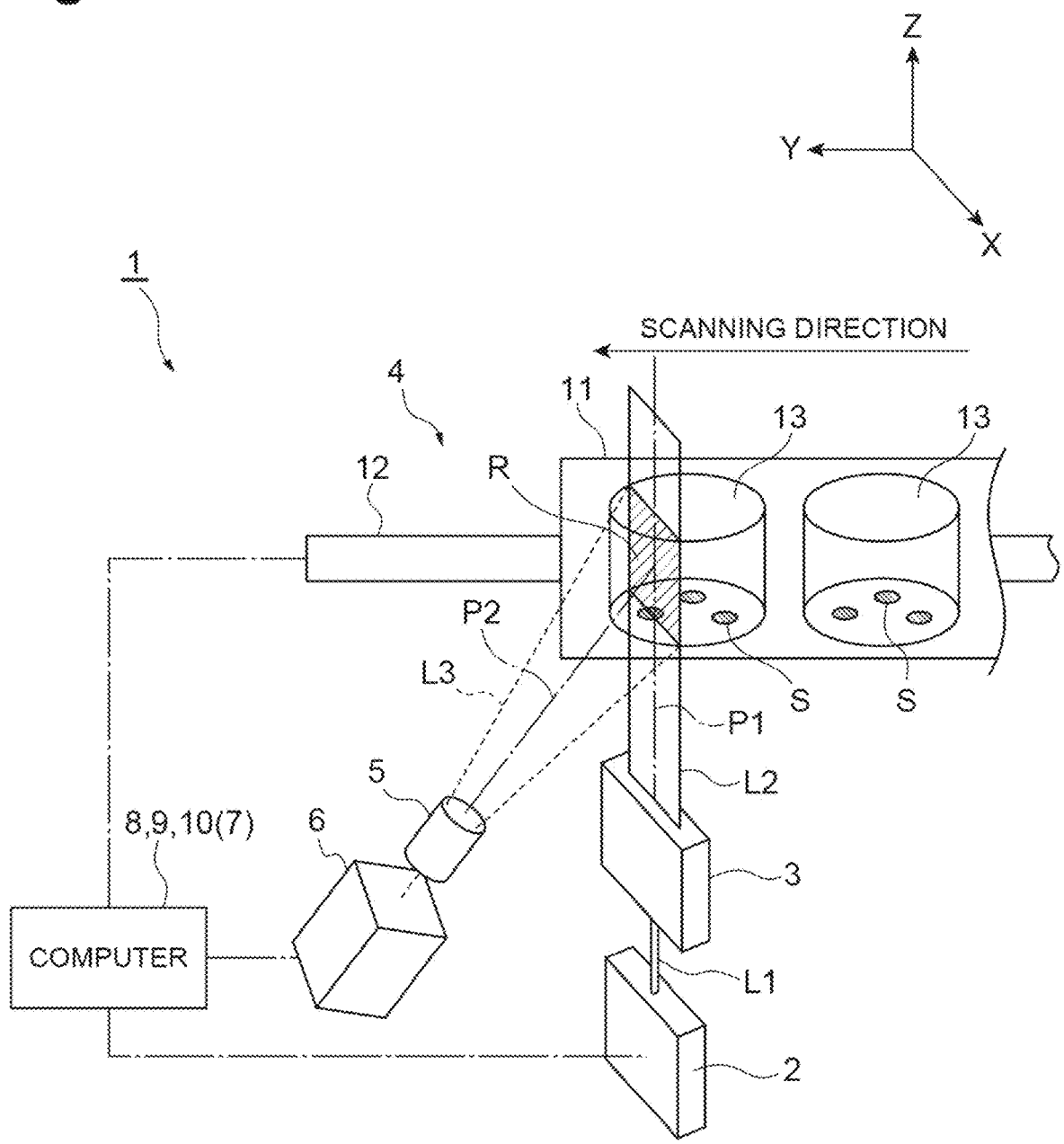
FIG. 1 is a schematic configuration view showing an embodiment of a sample observation device.

FIG. 1 is a schematic configuration view showing an embodiment of a sample observation device. This sample observation device 1 is a device that irradiates the sample S with planar light L2, images observation light (for example, fluorescence or scattered light) generated inside the sample S on an imaging surface, and acquires observation image data of the inside of the sample S. As this type of sample observation device 1, there is a slide scanner that acquires an image of the sample S held on a slide glass and displays the image, a plate reader that acquires image data of the sample S held on a microplate and analyzes the image data, or the like. As shown in FIG. 1, the sample observation device 1 includes a light source unit 2, an irradiation optical system 3, a scanning unit 4, an imaging optical system 5, an image acquisition unit 6, and a computer (a control unit) 7.

Examples of the sample S to be observed include cells, tissues, and organs of humans or animals, animals or plants themselves, cells and tissues of plants, and the like. These samples S are stained with a fluorescent material such as fluorescein-dextran (excitation wavelength: 494 nm/fluorescence wavelength: 521 nm) and tetramethylrhodamine (excitation wavelength: 555 nm/fluorescence wavelength: 580 nm). The sample S may be stained with a plurality of fluorescent substances. Further, the sample S may be contained in a solution, a gel, or a substance having a refractive index different from that of the sample S.

The light source unit 2 is a portion that outputs excitation light L1 that is applied to the sample S. Examples of a light source constituting the light source unit 2 include a laser light source such as a laser diode and a solid-state laser light source. The light source may be a light emitting diode, a super luminescent diode, or a lamp-based light source. The excitation light L1 output from the light source unit 2 is guided to the irradiation optical system 3. Further, the light source unit 2 has a plurality of dimming filters (not shown) having different transmittances from each other. In the light source unit 2, one dimming filter is selected from a plurality of dimming filters with a control signal from the computer 7, and a light amount of the excitation light L1 that is output from the light source unit 2 is controlled.

The irradiation optical system 3 is an optical system that shapes the excitation light L1 output from the light source unit 2 into planar light L2 and irradiates the sample S with the shaped planar light L2 along an optical axis P1. In the following description, the optical axis P1 of the irradiation optical system 3 may be referred to as an optical axis of the planar light L2. The irradiation optical system 3 includes, for example, an optical shaping element such as a cylindrical lens, an axicon lens, or a spatial light modulator and is optically coupled to the light source unit 2. The irradiation optical system 3 may be configured to include an objective lens. The planar light L2 formed by the irradiation optical system 3 is applied to the sample S. In the sample S irradiated with the planar light L2, observation light L3 is generated on an irradiation surface R of the planar light L2. The observation light L3 is, for example, fluorescence excited by the planar light L2, scattered light of the planar light L2, or diffusely reflected light of the planar light L2.

Figure 2:
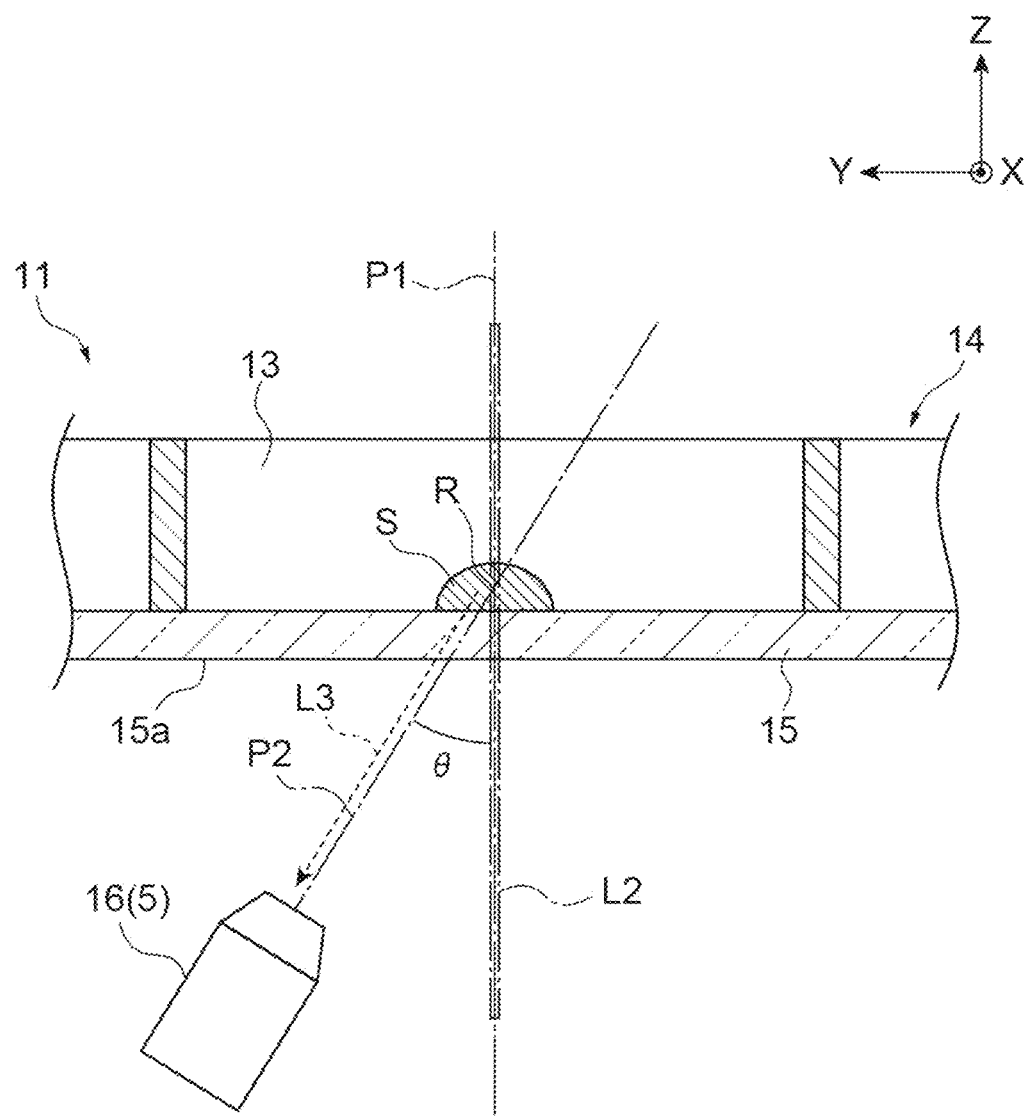
FIG. 2 is an enlarged view of a main part showing the vicinity of a sample.

The scanning unit 4 is a mechanism for scanning the sample S with respect to the irradiation surface R of the planar light L2. In the present embodiment, the scanning unit 4 is constituted by a moving stage 12 for moving a sample container 11 holding the sample S. The sample container 11 is, for example, a microplate, a slide glass, a Petri dish, or the like and has transparency with respect to the planar light L2 and the observation light L3. In the present embodiment, a microplate is illustrated. As shown in FIG. 2, the sample container 11 has a plate-shaped main body 14 in which a plurality of wells 13 in which the sample S is disposed are arranged in a straight line (or a matrix shape) and a plate-shaped transparent member 15 provided to close one end side of the well 13 on one surface side of the main body 14.

When the sample S is disposed in the well 13, the well 13 is filled with a solution such as a culture solution, a fluorescence indicator, and a buffer together with the sample S. The solution emits autofluorescence. The transparent member 15 has an input surface 15a of the planar light L2 with respect to the sample S disposed in the well 13. The material of the transparent member 15 is not particularly limited as long as it is a member having transparency to the planar light L2 and is, for example, glass, quartz, or a synthetic resin. The sample container 11 is disposed with respect to the moving stage 12 such that the input surface 15a is orthogonal to the optical axis P1 of the planar light L2. The other end side of the well 13 opens to the outside. The sample container 11 may be fixed to the moving stage 12.

As shown in FIG. 1, the moving stage 12 scans the sample container 11 in a preset direction at a constant speed in response to a control signal from the computer 7. In the present embodiment, the moving stage 12 scans the sample container 11 in one direction in a plane orthogonal to the optical axis P1 of the planar light L2. In the following description, a direction of the optical axis P1 of the planar light L2 is referred to as a Z axis, a scanning direction of the sample container 11 due to the moving stage 12 is referred to as a Y axis, and a direction orthogonal to the Y axis in a plane orthogonal to the optical axis P1 of the planar light L2 is referred to as the X axis. The irradiation surface R of the planar light L2 with respect to the sample S is a surface in an XZ plane.

The imaging optical system 5 is an optical system that images the observation light L3 generated in the sample S by irradiation with the planar light L2. As shown in FIG. 2, the imaging optical system 5 includes, for example, an objective lens 16. An optical axis of the imaging optical system 5 is an observation axis P2 of the observation light L3. The observation axis P2 of the imaging optical system 5 is inclined with an inclination angle θ with respect to the irradiation surface R of the planar light L2 in the sample S. The inclination angle θ also coincides with an angle formed by the optical axis P1 of the planar light L2 and the observation axis P2 toward the sample S. The inclination angle θ is, for example, 10° to 80°. From the viewpoint of improving the resolution of an observation image, the inclination angle θ is preferably 20° to 70°. Further, from the viewpoint of improving the resolution of the observation image and the stability of the visual field, the inclination angle θ is more preferably 30° to 65°.

Figure 3:
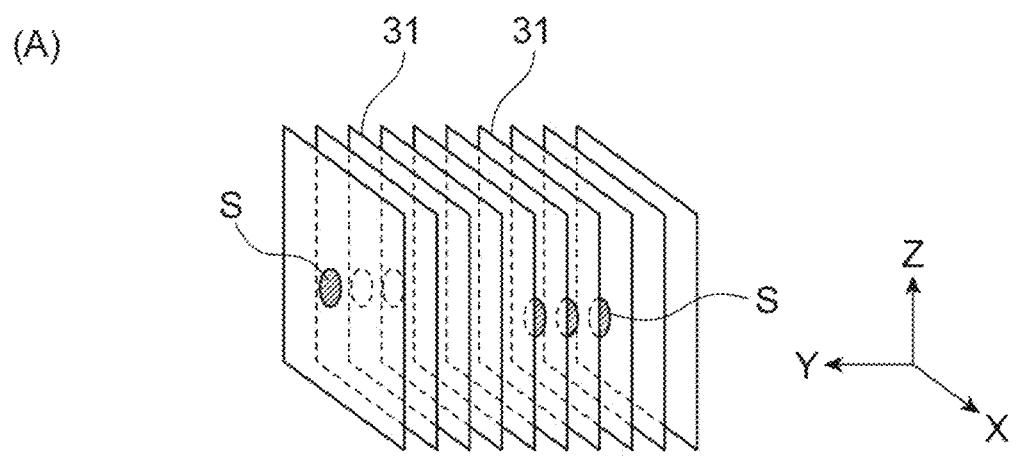
FIG. 3 is a view showing an example of generation of an observation image using an image generation unit.
Figure 3:
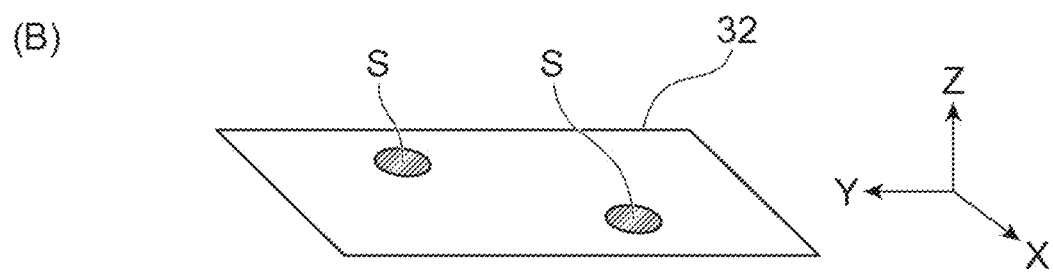

As shown in FIG. 1, the image acquisition unit 6 is a portion that acquires a plurality of pieces of XZ image data corresponding to an optical image of the observation light L3 imaged by the imaging optical system 5. The image acquisition unit 6 includes, for example, an image pickup device that captures an optical image of the observation light L3. Examples of the image pickup device include area image sensors such as a CMOS image sensor and a CCD image sensor. These area image sensors are disposed on an imaging surface of the imaging optical system 5 and capture an optical image by, for example, a global shutter or a rolling shutter. The area image sensor acquires a plurality of pieces of XZ image data (see FIG. 3), which is data of the two-dimensional image of the sample S, in a Y-axis direction at a predetermined frame rate and outputs the data to the computer 7.

The computer 7 physically includes a memory such as RAM and ROM, a processor (an arithmetic circuit) such as a CPU, a communication interface, a storage unit such as a hard disk, and a display unit such as a display. Examples of such a computer 7 include a personal computer, a cloud server, a smart device (a smartphone, a tablet terminal, or the like), and the like. The computer 7 functions as a control unit 9 that controls the operations of the light source unit 2 and the scanning unit 4, an image generation unit 8 that generates observation image data of the sample S, and an analysis unit 10 that performs analysis of the sample S on the basis of the observation image data by causing a CPU of a computer system to execute a program stored in a memory.

The computer 7 serving as the control unit 9 receives an input of a measurement start operation from a user and drives the light source unit 2, the scanning unit 4 (the moving stage 12), and the image acquisition unit 6 in synchronization with each other. In this case, the computer 7 may control the light source such that the light source unit 2 continuously outputs the excitation light L1 while the sample S is being moved by the moving stage 12 and may control the ON/OFF of the output of the excitation light L1 from the light source unit 2 in accordance with the imaging of the image acquisition unit 6. Further, when the irradiation optical system 3 is provided with an optical shutter (not shown), the computer 7 may control the ON/OFF of the irradiation of the sample S with the planar light L2 by controlling the optical shutter.

The computer 7 serving as the image generation unit 8 generates the observation image data of the sample S on the basis of the plurality of pieces of XZ image data generated by the image acquisition unit 6. The image generation unit 8 generates the observation image data of the sample S on a plane (an XY plane) orthogonal to the optical axis P1 of the planar light L2, for example, on the basis of the plurality of pieces of XZ image data output from the image acquisition unit 6. Specifically, in the image generation unit 8, as shown in FIG. 3(a), the plurality of pieces of XZ image data 31 are acquired in the Y-axis direction, and thus three-dimensional information on the sample S is accumulated. In the image generation unit 8, the data is reconstructed using the plurality of pieces of XZ image data 31, and for example, as shown in FIG. 3(b), XY image data 32 having an arbitrary thickness at an arbitrary position in the sample S in a Z-axis direction is generated as the observation image data of the sample S. The image generation unit 8 may generate three-dimensional data including the XY image data 32 as the observation image data. The image generation unit 8 executes storage of the generated observation image data, display of the generated observation image data on a monitor or the like, and the like according to a predetermined operation of the user.

The computer 7 serving as the analysis unit 10 executes analysis on the basis of the observation image data generated by the image generation unit 8 and generates an analysis result. The analysis unit 10 executes storage of the generated analysis result, display of the generated analysis result on the monitor or the like, and the like according to a predetermined operation of the user. The observation image data generated by the image generation unit 8 may not be displayed on the monitor or the like, and only the analysis result generated by the analysis unit 10 may be displayed on the monitor or the like.

Next, the control unit 9 described above will be described in more detail.

As described above, the control unit 9 controls the operations of the light source unit 2, the scanning unit 4 (the moving stage 12), and the image acquisition unit 6 in performing observation of the sample S. In controlling each of these elements, in this sample observation device 1, the concept of "measurement sensitivity" represented by the product of the light amount of the planar light L2 that is applied to the sample S and a scanning speed of the sample S due to the moving stage 12 is introduced, and the scanning speed of the sample S and an optimum light amount of the planar light L2 that is applied to the sample S are determined according to the measurement sensitivity selected by the user.

Figure 4:
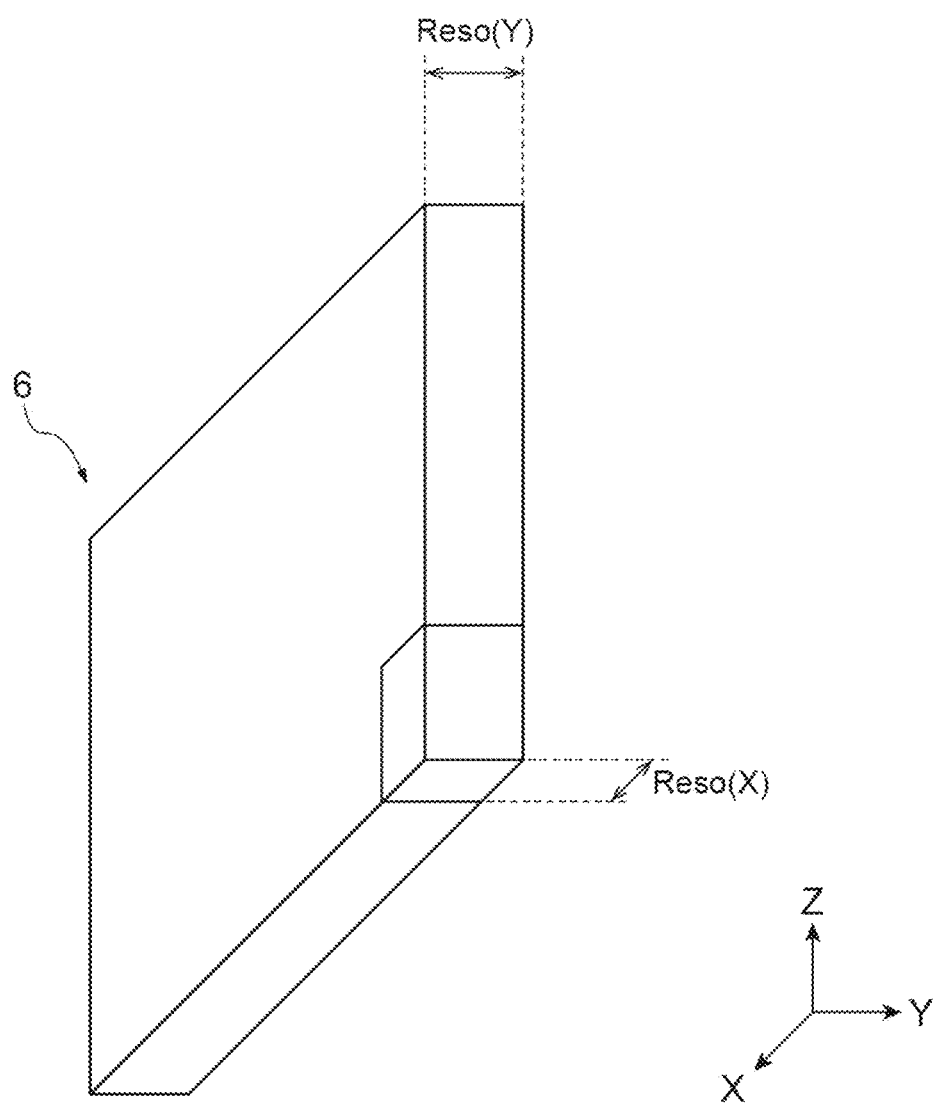
FIG. 4 is a schematic view showing a relationship between resolutions of image data acquired by an image acquisition unit in an X-axis direction and a Y-axis direction.

In a case where the observation of the sample S is performed in the sample observation device 1, as shown in FIG. 4, it is necessary to control the scanning speed of the sample S and an exposure time such that a resolution Reso (X) in an X-axis direction and a resolution Reso (Y) in the Y-axis direction are equal to each other in the image acquisition unit 6. As an example, it is conceivable to perform control such that trigger signals be input to the image acquisition unit 6 from the moving stage 12 at an interval corresponding to the Reso (Y) and the exposure be performed corresponding to the interval of the trigger signals. The Reso (X) can be determined by dividing a pixel size of the image pickup device constituting the image acquisition unit 6 in the X-axis direction by a magnification, and the Reso (Y) can be determined by dividing of a pixel size of the image pickup device in the Y-axis direction by a magnification. Further, the exposure time can be determined on the basis of the frame rate of the image pickup device constituting the image acquisition unit 6. By determining the exposure time, it is possible to calculate the scanning speed at which the resolution in the X-axis direction and the resolution in the Y-axis direction are equal to each other. For example, in a case where the frame rate (the maximum frame rate) of the image pickup device constituting the image acquisition unit 6 is 10 kHz, the exposure time is 0.1 ms. In this case, if Reso (X)=Reso (Y)=10 μm, the scanning speed is determined to be 100 mm/s.

Further, the light amount of the observation light L3 that can be acquired by the image acquisition unit 6 is determined by the product of the light amount of the observation light L3 per unit time and the exposure time. The light amount of the observation light L3 can be determined on the basis of the light amount of the planar light L2 that is applied to the sample S, and the exposure time can be determined on the basis of the scanning speed of the sample S as described above. That is, the measurement sensitivity, which is the product of the light amount of the planar light L2 and the scanning speed of the sample S, can be determined by the light amount of the planar light L2 for the same scanning speed. There are a plurality of conditions in which the optimum light amount of the planar light L2 is the same for different measurement sensitivities, but the scanning speeds at that time are different. For this reason, in the control unit 9, in determining the scanning speed of the sample S and the optimum light amount of the planar light L2 that is applied to the sample S, a reference table in which the optimum light amount of planar light L2 at the measurement sensitivity is set according to the scanning speed is referred to, and the scanning speed of the sample S and the optimum light amount of the planar light L2 are automatically determined on the basis of the measurement sensitivity selected by the user.

FIGS. 5 to 7 are diagrams each showing an example of the reference table. In the present embodiment, the control unit 9 has a plurality of different reference tables 41 (41A to 41C) according to the frame rate of the image pickup device constituting the image acquisition unit 6. The reference table 41A shown in FIG. 5 is used in a case where the frame rate is high (for example, 3500 fps), the reference table 41B shown in FIG. 6 is used in a case where the frame rate is medium (for example, 3000 fps), and the reference table 41C shown in FIG. 7 is used in a case where the frame rate is low (for example, 2500 fps). The reference table 41 may be stored in the control unit 9 in advance and may be stored in the control unit 9 by causing the computer 7 to read a recording medium in which data constituting the reference table 41 is stored. Further, each observation of the sample S may be stored in the control unit 9 through wired or wireless communication.

In these reference tables 41A to 41C, a row direction is the measurement sensitivity and a column direction is the scanning speed. The optimum light amount of the planar light L2 at each measurement sensitivity is shown as a relative value in a case where the maximum output of the excitation light L1 that is output from the light source unit 2 is 100%. The relative value is entered in a field of the measurement sensitivity in the row direction. In the examples of FIGS. 5 to 7, the scanning speed is 10 mm/s and the light amount of the planar light L2 is 10% at the minimum set value of the measurement sensitivity, and the product in this case is the relative value 1.

The frame rate of the image pickup device in the image acquisition unit 6 is determined corresponding to the sub-array size of the image acquisition unit 6. The setting of the sub-array size is selected by the user in consideration of an amount of data used for observing the sample S, an observation accuracy, an observation area in a depth direction, and the like. Since the frame rate increases as the sub-array size decreases, it is possible to increase the maximum value of the scanning speed. In the reference tables 41A to 41C, a relationship between the measurement sensitivity and the scanning speed is set such that the maximum scanning speed that can be obtained at the frame rate of the image acquisition unit 6 is determined as the scanning speed.

In the reference table 41A selected in a case where the sub-array size is small, as shown in FIG. 5, the maximum value of the scanning speed is 10 mm/s. In a case where this reference table 41A is selected, the scanning speed is set to 10 mm/s in a case where the setting of the relative value is 1 to 10, the scanning speed is set to 7 mm/s in a case where the setting of the relative value is 12 to 14, and the scanning speed is set to 5.5 mm/s in a case where the setting of the relative value is 16 to 18. Further, the scanning speed is set to 4 mm/s in a case where the setting of the relative value is 20 to 24, and the scanning speed is set to 2.5 mm/s in a case where the setting of the relative value is 26 to 40. In the range where the scanning speed is the same, the larger the setting of the relative value, the larger the setting value of the light amount of the planar light L2.

In the reference table 41B selected in a case where the sub-array size is medium, as shown in FIG. 6, the maximum value of the scanning speed is 8.5 mm/s. In a case where this reference table 41B is selected, the scanning speed is set to 8.5 mm/s in a case where the setting of the relative value is 2 to 10, the scanning speed is set to 7 mm/s in a case where the setting of the relative value is 12 to 14, and the scanning speed is set to 5.5 mm/s in a case where the setting of the relative value is 16 to 18. Further, the scanning speed is set to 4 mm/s in a case where the setting of the relative value is 20 to 24, and the scanning speed is set to 2.5 mm/s in a case where the setting of the relative value is 26 to 40. In the range where the scanning speed is the same, the larger the setting of the relative value, the larger the setting value of the light amount of the planar light L2.

In the reference table 41C selected in a case where the sub-array size is large, as shown in FIG. 7, the maximum value of the scanning speed is 7 mm/s. In a case this reference table 41C is selected, the scanning speed is set to 7 mm/s in a case where the setting of the relative value is 2 to 14, and the scanning speed is set to 5.5 mm/s in a case where the setting of the relative value is 16 to 18. Further, the scanning speed is set to 4 mm/s in a case where the setting of the relative value is 20 to 24, and the scanning speed is set to 2.5 mm/s in a case where the setting of the relative value is 26 to 40. In the range where the scanning speed is the same, the larger the setting of the relative value, the larger the setting value of the light amount of the planar light L2.

The control unit 9 selects one reference table 41 from the plurality of reference tables 41A to 41C on the basis of the frame rate corresponding to the sub-array size selected by the user. Then, the selected reference table 41 is referred to, and the scanning speed of the sample S and the optimum light amount of the planar light L2 are determined on the basis of the measurement sensitivity selected by the user. The control unit 9 controls the operations of the light source unit 2 and the scanning unit 4 on the basis of the determined scanning speed and optimum light amount.

In controlling the light source unit 2, the control unit 9 controls the light amount of the excitation light L1 that is output from the light source unit 2 on the basis of the determined optimum light amount. As described above, the light source unit 2 is provided with the plurality of dimming filters (not shown) having different transmittances from each other. The control unit 9 selects one dimming filter from the plurality of dimming filters on the basis of the determined optimum light amount and controls the light amount of the excitation light L1 that is output from the light source unit 2. By controlling the light amount of the excitation light L1, it is possible to control the light amount of the planar light L2 that is applied to the sample S, and as a result, it is possible to control the light amount of the observation light L3 that is generated in the sample S.

Figure 8:
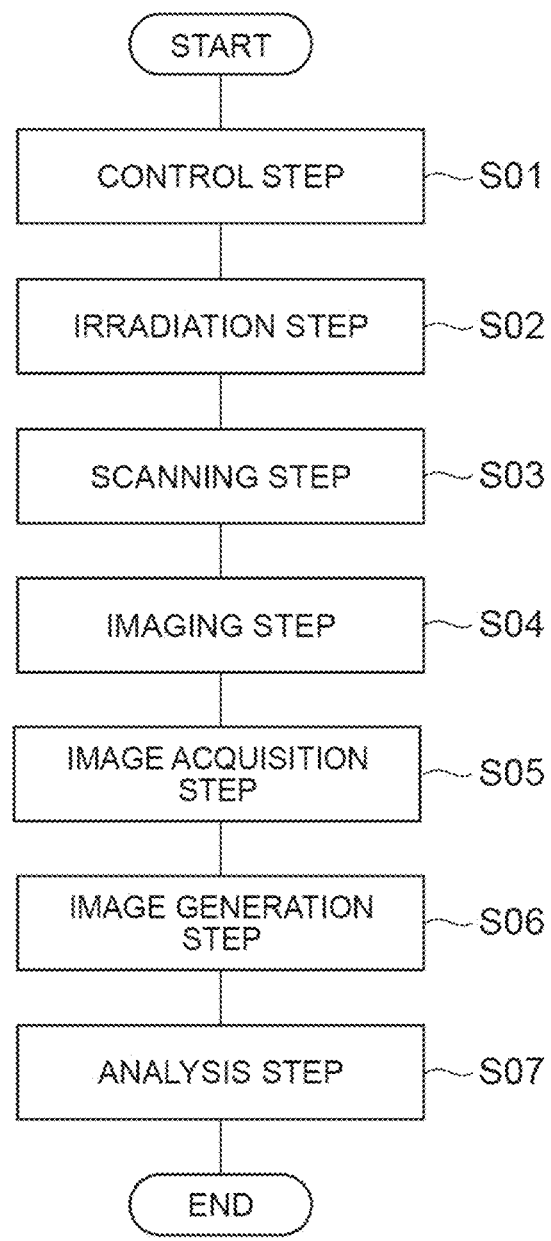
FIG. 8 is a flowchart showing an example of a sample observation method.

FIG. 8 is a flowchart showing an example of a sample observation method. As shown in the figure, this sample observation method includes a control step (step S01), an irradiation step (step S02), a scanning step (step S03), an imaging step (step S04), an image acquisition step (step S05), an image generation step (step S06), and an analysis step (step S07).

In the control step S01, first, the selection of the measurement sensitivity and the selection of the sub-array size from the user are received. In the control unit 9, the frame rate of the image pickup device constituting the image acquisition unit 6 is set on the basis of the sub-array size selected by the user, and the reference table 41 corresponding to the set frame rate is selected from among the reference tables 41A to 41C. Next, in the control unit 9, the selected reference table 41 is referred to, and the scanning speed and the optimum light amount corresponding to the measurement sensitivity selected by the user.

In the irradiation step S02, the sample S is irradiated with the planar light L2. When the operation to start measurement is input by the user, the light source unit 2 is driven on the basis of the control signal from the computer 7, and the excitation light L1 is output from the light source unit 2. The excitation light L1 output from the light source unit 2 is shaped by the irradiation optical system 3 to become the planar light L2, which is applied to the sample S. The light amount of the excitation light L1 that is output from the light source unit 2 is controlled through the selection of the dimming filter in the control unit 9 to be the optimum light amount determined in the control step S01.

In the scanning step S03, the sample S is scanned with respect to the irradiation surface R of the planar light L2. When the operation to start measurement is input by the user, the moving stage 12 is driven on the basis of the control signal from the computer 7 in synchronization with the drive of the light source unit 2. As a result, the sample container 11 is linearly driven in the Y-axis direction at a constant speed, and the sample S in the well 13 is scanned with respect to the irradiation surface R of the planar light L2. The scanning speed of the sample S due to the moving stage 12 is controlled by the control unit 9 to be the scanning speed determined in the control step S01.

In the imaging step S04, the observation light L3 generated in the sample S by irradiation with the planar light L2 is imaged on the imaging surface of the image acquisition unit 6 using the imaging optical system 5 having the observation axis P2 inclined with respect to the irradiation surface R. In the image acquisition step S05, the plurality of pieces of XZ image data 31 corresponding to the optical image of the observation light L3 imaged by the imaging optical system 5 are acquired in the Y-axis direction at a predetermined frame rate. The plurality of pieces of XZ image data 31 are sequentially output from the image acquisition unit 6 to the image generation unit 8.

In the image generation step S06, the observation image data of the sample S is generated on the basis of the plurality of pieces of XZ image data 31. Here, the XY image data 32 having the arbitrary thickness at the arbitrary position in the sample S in the Z-axis direction is generated as the observation image data of the sample S on the basis of the plurality of pieces of XZ image data 31 obtained in the image acquisition step S05.

In the analysis step S07, the observation image data is analyzed by the analysis unit 10 to generate an analysis result. For example, in drug discovery screening, the XY image data 32, which is the observation image data, is acquired in a state where the sample S and a reagent are put in the sample container 11. In the analysis unit 10, the reagent is evaluated on the basis of the obtained XY image data 32, and evaluation data is generated as the analysis result. The analysis unit 10 may acquire three-dimensional data including the XY image data 32 as the observation image data for analyzing.

As described above, in the sample observation device 1, the concept of the measurement sensitivity represented by the product of the light amount of the planar light L2 and the scanning speed is introduced, the reference table 41 in which the optimum light amount of the planar light at the measurement sensitivity is set according to the scanning speed is referred to, and thus the scanning speed of the sample S and the optimum light amount of the planar light L2 that is applied to the sample S are determined according to the measurement sensitivity selected by the user. In this sample observation device 1, by selecting the user selects the measurement sensitivity, the scanning speed of the sample S and the optimum light amount of the planar light L2 that is applied to the sample S are determined without making complicated setting for the light source unit 2, the scanning unit 4, and the image acquisition unit 6, and thus, it is possible to simplify the setting of measurement conditions.

Further, in the sample observation device 1, the maximum scanning speed that can be obtained at the frame rate of the image acquisition unit 6 is determined as the scanning speed. The scanning speed is a parameter related to a throughput of the sample observation. Therefore, by determining the maximum scanning speed that can be obtained at the frame rate of the image acquisition unit 6 as the scanning speed, it is possible to improve the throughput of the sample observation.

Further, in the sample observation device 1, the control unit 9 has the plurality of different reference tables 41 (41A to 41C) according to the frame rate, selects one reference table 41 from the plurality of reference tables 41A to 41C on the basis of the frame rate corresponding to the sub-array size of the image acquisition unit 6 which is selected by the user, and determines the scanning speed and the optimum light amount using the selected reference table 41. Since the frame rate increases as the sub-array size decreases, it is possible to increase the maximum value of the scanning speed. Therefore, by selectively using the plurality of different reference tables 41A to 41C according to the frame rate, it is possible to more reliably improve the throughput of the sample observation.

Further, in the sample observation device 1, the light amount of the excitation light L1 that is output from the light source unit 2 is controlled on the basis of the determined optimum light amount. By controlling the light amount of the excitation light L1 in this way, it is possible to easily control the light amount of the planar light L2 that is applied to the sample S. In the sample observation device 1, in controlling the light amount of the excitation light L1, one dimming filter is selected from the plurality of dimming filters having different transmittances from each other. Therefore, the light amount of the excitation light L1 can be easily controlled.

The present disclosure is not limited to the above embodiments. For example, in the above embodiment, the control unit 9 has the plurality of different reference tables 41 (41A to 41C) according to the frame rate, but the control unit 9 may have a single reference table 41 regardless of the frame rate. Further, in the above embodiment, the control unit 9 controls such that the light amount of the excitation light L1 becomes the optimum light amount by selecting one dimming filter from the plurality of dimming filters disposed in the light source unit 2, but an aspect in which for the planar light L2, one dimming filter is selected from a plurality of dimming filters is also possible. Further, an aspect in which the control unit 9 controls the output of the light source itself by controlling a current value or a voltage value that is applied to the light source unit 2 is also possible. Even in this case, the light amount of the excitation light L1 can be easily controlled.

The invention claimed is:

1. A sample observation device comprising:
a light source unit configured to output excitation light to a sample;
an irradiation optical system configured to shape the excitation light into planar light and to irradiate the sample with the planar light on an XZ surface;
a scanning unit configured to scan the sample in a Y-axis direction at a predetermined scanning speed to pass through an irradiation surface of the planar light;
an imaging optical system having an observation axis inclined with respect to the irradiation surface and configured to image an observation light generated in the sample by irradiation with the planar light;
an image acquisition unit configured to acquire a plurality of pieces of XZ image data corresponding to an optical image of the observation light imaged by the imaging optical system at a predetermined frame rate; and
a control unit configured to control a light amount of the planar light and the scanning speed,
wherein the control unit refers to a reference table in which an optimum light amount of the planar light at a measurement sensitivity represented by the product of the light amount of the planar light and the scanning speed is set in accordance with the scanning speed and determines the scanning speed and the optimum light amount of the planar light on the basis of the measurement sensitivity selected by a user.

2. The sample observation device according to claim 1, wherein the control unit determines a maximum scanning speed that can be obtained at the frame rate as the scanning speed.

3. The sample observation device according to claim 1, wherein the control unit has a plurality of different reference tables according to the frame rate, selects one reference table from the plurality of reference tables on the basis of a frame rate corresponding to a sub-array size of the image acquisition unit which is selected by the user, and determines the scanning speed and the optimum light amount using the selected reference table.

4. The sample observation device according to claim 1, wherein the control unit controls a light amount of the excitation light that is output from the light source unit on the basis of the determined optimum light amount.

5. The sample observation device according to claim 4, wherein the light source unit has a plurality of different transmittances, and
wherein the control unit selects one from the plurality of transmittances on the basis of the determined optimum light amount and controls the light amount of the excitation light that is output from the light source unit.

6. The sample observation device according to claim 4, wherein the control unit controls a current value or a voltage value that is applied to the light source unit on the basis of the determined optimum light amount.

7. A sample observation method comprising:
an output step of outputting excitation light to a sample;
an irradiation step of shaping the excitation light into planar light and irradiating the sample with the planar light on an XZ surface;
a scanning step of scanning the sample in a Y-axis direction at a predetermined scanning speed to pass through an irradiation surface of the planar light;
an imaging step of imaging an observation light generated in the sample by irradiation with the planar light using an imaging optical system having an observation axis inclined with respect to the irradiation surface;
an image acquisition step of acquiring a plurality of pieces of XZ image data corresponding to an optical image of the observation light imaged by imaging optical system at a predetermined frame rate; and
a control step of controlling a light amount of the planar light and the scanning speed in executing each of the steps,
wherein, in the control step, a reference table in which an optimum light amount of the planar light at a measurement sensitivity represented by the product of the light amount of the planar light and the scanning speed is set according to the scanning speed is referred to and the scanning speed and the optimum light amount of the planar light on the basis of the measurement sensitivity selected by a user is determined.

8. The sample observation method according to claim 7, wherein, in the control step, a maximum scanning speed that can be obtained at the frame rate is determined as the scanning speed.

9. The sample observation method according to claim 7, wherein, in the control step, a plurality of different reference tables according to the frame rate is used, one reference table from the plurality of reference tables is selected on the basis of a frame rate corresponding to a sub-array size at the time of executing the image acquisition step which is selected by the user, and the scanning speed and the optimum light amount are determined using the selected reference table.

10. The sample observation method according to claim 7, wherein, in the control step, a light amount of the excitation light in the output step is controlled on the basis of the determined optimum light amount.

11. The sample observation method according to claim 10,
wherein, in the output step, a plurality of different transmittances are used, and
wherein, in the control step, one is selected from the plurality of transmittances on the basis of the determined optimum light amount, and the light amount of the excitation light in the output step is controlled.

12. The sample observation method according to claim 10, wherein, in the control step, a current value or a voltage value that is applied to a light source unit that outputs the excitation light is controlled on the basis of the determined optimum light amount, and the light amount of the excitation light in the output step is controlled.

* * * * *